United States Patent [19]

de Saint Romain

[11] Patent Number: 5,273,575
[45] Date of Patent: Dec. 28, 1993

[54] INKS FOR THE MARKING OR DECORATION OF OBJECTS, SUCH AS CERAMIC OBJECTS

[75] Inventor: Pierre de Saint Romain, Valence, France

[73] Assignee: IMAJE S.A., Bourg les Valence, France

[21] Appl. No.: 886,713

[22] Filed: May 21, 1992

[30] Foreign Application Priority Data

May 24, 1991 [FR] France ................. 91 06284

[51] Int. Cl.$^5$ ............................. C09D 11/02
[52] U.S. Cl. ..................... 106/23 B; 106/21 A
[58] Field of Search .............. 105/23 B, 22 B, 21 A

[56] References Cited

U.S. PATENT DOCUMENTS

| | | | |
|---|---|---|---|
| 3,944,736 | 11/1976 | Hertz et al. | 106/23 B |
| 4,029,506 | 6/1977 | Dessauer | 106/21 A |
| 4,070,322 | 1/1978 | Hwang et al. | 106/22 C |
| 4,680,058 | 7/1987 | Shimizu et al. | 106/23 B |
| 4,940,628 | 7/1990 | Lin et al. | 106/23 B |

FOREIGN PATENT DOCUMENTS 0379674 8/1990 European Pat. Off. .
62-250081 10/1987 Japan .
2-284678 11/1990 Japan .

*Primary Examiner*—Helene Klemanski
*Attorney, Agent, or Firm*—Roland Plottel

[57] ABSTRACT

An ink that can be sprayed on an object in jets comprises:
(a) zero (plus) to forty percent by mass of one or more metallic salts soluble in a solvent;
(b) zero to forty percent by mass of one or more solvents;
(c) zero to five percent of one or more organic dyes;
(d) zero to ten percent of a polymer;
(d) one or more solvents which are more volatile than the solvent or solvents of (b).

16 Claims, No Drawings

INKS FOR THE MARKING OR DECORATION OF OBJECTS, SUCH AS CERAMIC OBJECTS

BACKGROUND OF THE INVENTION

1. Field of the Invention

The invention relates to inks that can be used for the marking and decoration of objects that have to be brought to high temperatures, such as objects made of ceramic type material. The inks according to the invention are particularly capable of being used for the marking or decoration of objects by ink jet.

Ink jet printing is a well known technique that enables the high-speed marking and decoration of all kinds of objects, without contact between the printing device and these objects. The printing devices may be of the "Drops on Demand" (D.O.D.) type or of the "continuous ink jet" type.

2. Description of the Prior Art

The ingredients of presently used inks are organic products, dyes, pigments or resins that are dispersed in solvents of varying volatility or in water. None of these ingredients, except for titanium oxide used in white inks, can withstand temperatures of over 300° C. for more than a few minutes.

Now, the ceramics manufacturing industry uses techniques for the sintering or melting of powders in which the objects are brought to temperatures of at least 500° C., and possibly of up to 1300° C. and more: this means that inks containing organic products cannot be used.

Before the above-mentioned heating operation, the objects are generally pulverulent and cannot be handled without the risk of being damaged on the surface. Hence, when these objects have to be referenced, marked or decorated indelibly, the manufacturers make use of either modifications of the relief of the objects before baking or a first baking operation at low temperature so that they can be handled and are not pulverulent on the surface.

Then, markings or decorations are applied to these partially fired objects, notably by decal or transfer process. The colors of these decal operations are given by exclusively mineral pigments which are resistant to the baking temperatures of these objects. Mineral pigments of this kind are combinations of metallic oxides which, by their particular crystal structure, like that of spinels, have different and varying colors.

A non-exhaustive list of the most commonly used metals, with colored or opaque oxides, would include iron, chromium, copper, cobalt, manganese, antimony, titanium, zirconium, tin and vanadium, these metals being used alone or combined with each other or, again, combined with metals like silicon, magnesium, the oxides of which are not colored.

For the decoration of ceramics, it has been proposed to use the ink jet printing method (cf. article by W. Roberts in the journal "L'INDUSTRIE CERAMIQUE" No. 827.5/88) by using the same pigments as those used in the standard printing of ceramics as indicated here above. In a method such as this, the main problem to be resolved is the one related to the great difference in density between the pigment and the liquid in which it is dispersed.

DESCRIPTION OF THE INVENTION

The object of the present invention then is to obtain inks capable of being sprayed in jets that can be used for marking or decoration at temperatures of over 300° C.

The invention also relates to an ink that can be sprayed in jets, wherein said ink consists of a solution of at least one metallic salt soluble in at least one solvent.

The proportion of soluble metallic salt preferably ranges from zero (plus) to forty percent of the total mass of the ink.

Should several solvents be used, at least one of them may be a solvent with low volatility in a proportion of forty percent at most, the others being more volatile than the first one.

For certain metallic salts, the color of which appears only after baking, the invention proposes the addition of organic dyes in a proportion of 5 percent, at most, of the total mass of ink so as to bring out the marking or the decoration before baking.

To prevent the spreading of the ink sprayed in and/or on the surface of the object, the invention proposes the addition of a polymer in a proportion, at most, of ten percent of the total mass of the ink.

The metallic salts that can be used are those mineral or metalorganic salt of the metals which, after decomposition at high temperature, form colored oxides or colored combinations with the material constituting the object. A non-exhaustive list of these metals would include chromium, manganese, iron, cobalt, copper, zinc, molybdenum, tin, antimony, boron, lead, zirconium, titanium and vanadium.

The solvents used are preferably ethanol, methanol or water to which a less volatile solvent, such as glycerol or dimethylformamide, may be added.

With compositions such as these, it is possible to obtain inks having viscosities of 1 to 10 centipoises (millipascal-sec) capable of being used in ink jet printing devices.

The inks according to the invention may be generally defined by the following proportions of the ingredients in relation to the total mass of each ink:

(a) zero (plus) to forty percent of one or more soluble metallic salts;
(b) zero to forty percent of one or more solvents;
(c) zero to five percent of one or more organic dyes;
(d) zero to ten percent of one or more polymers;
(d) the rest being constituted by one or more solvents which are more volatile than the solvent or solvents of (b).

It will be noted that the ingredients or products (b), (c) and (d) are not necessary for certain inks and are therefore used only for special applications as shall be seen hereinafter in the description, notably in that of the different examples.

The metallic salts that can be used are those obtained out of metals which, after decomposition by heat, form colored oxides or colored combinations with the material of the object on which they are deposited. The metals that give colored metallic oxides are very numerous. A non-exhaustive list of these metals would include, for example: chromium, manganese, iron, cobalt, copper, zinc, molybdenum, tin, antimony, boron, lead, zirconium, titanium and vanadium. The choice of the metallic salt or salts shall be guided by the following considerations:

Solubility in the Solvent or Solvents Used:

The metallic salt should be soluble in the solvent or solvents used and should therefore not be in a state of dispersion as a standard pigment would be.

Volatility

The metallic salt should not get volatilized before or at the same time as it gets decomposed and converted into oxide with or without combination with the material of the object to be marked or colored. The metallic salts can be mineral products as the chlorides, the sulfates, the nitrates, the acetates, the propionates, the carbonates, and organo-metallic products as the naphthanates, the octoates, the neo-decanoates, the resinates and their derived products.

Ionic Dissociation in the Solvent

Should the printing device use an electrostatically deflected continuous ink jet, whether binary or patterned, the ink should be conductive.

Properties of Oxidation and Corrosion of the Printing Device

The metallic salt should not oxidize or corrode the materials used to manufacture the printing devices. Thus, chlorides are known to catalyze oxidation reactions of steels and are therefore to be avoided in this case. Similarly, the electropositivity of certain metals such as aluminium, in the presence of certain metallic salts with lower electropositivity than that of the metal used to manufacture the printing device, may lead to major levels of corrosion.

Toxicity

The toxic metallic salts should be avoided in certain applications owing to their toxicity with respect to the environment. Thus, it is known that chromium VI salts are far more toxic than chromium III salts.

Color to be Obtained

The color to be obtained depends not only on that of the metallic salt used but also on the material of the object with which the metallic salt will react. Thus, certain cobalt salts may give blue or black colors depending on the material of the object and on the baking temperature.

Maximum Baking Temperature of the Object

It is thus that the copper oxides obtained after the baking of the object are volatilized when the baking temperature exceeds 500° C.

The organic dye or dyes are usually necessary because the metallic salts in solution have only a very low dyeing intensity and, furthermore, this intensity may vary with the humidity. The use of such a dye enables the marking or coloring to be made visible on this object before it is heated to high temperature.

Owing to its essentially organic nature, the dye will be destroyed by the heat and will not interfere with the metallic compound. The choice of this dye will be guided essentially by its solubility in the solution of metallic salts.

Furthermore, it should neither destabilize the solution nor give rise to precipitate.

Among the wide variety of organic dyes, preference will be given to those that have high dyeing capacity and are compatible with the metallic salts used before and during the baking process. This is the case with acid dyes and food coloring agents.

The polymer that may be used has the function of regulating the spread, in the material of the object, of the ingredients that contribute the dyeing effect. The product chosen will preferably be a polymer or polymers soluble in the solvents used. Preferably a derivative of cellulose or a phenolic resin will be used.

The choice of the solvents is guided by the following criteria:

Solubility

The solvent should dissolve the metallic salt or salts.

Polarity

When the ink needs to have electrical conductivity, the polarity of the solvent should enable the ionic dissociation of the solution. In this case, water and alcohols are preferred solvents.

Volatility

The quality of volatility enables the checking of the penetration of the ink into the porous objects. Furthermore, certain metallic salts or metalorganic salts tend to crystallize during the evaporation of the solvent in which they are dissolved. In this case, it is important to use a solvent of low volatility in order to prevent the crystallization, in the circuits, of fluids from the printing devices.

Toxicity

The solvent should not be toxic in relation to the environment and the user. For this reason, it is preferable to use ethanol instead of methanol.

As an illustration of the invention, the following table gives seven examples of compositions of inks as well as their corresponding viscosity and conductivity.

| | e1 | e2 | e3 | e4 | e5 | e6 | e7 |
|---|---|---|---|---|---|---|---|
| Manganese(II) chloride with 4 molecules of water | — | — | — | 22 | 22.5 | 25 | — |
| Cobalt(II) chloride with 6 molecules of water | — | — | — | — | 2.5 | — | 20 |
| Chromium(III) chloride with 6 molecules of water | — | 40 | — | — | — | — | — |
| Copper nitrate with 3 molecules of water | 25 | — | — | — | — | — | — |
| Cobalt acetate with 4 molecules of water | — | — | 25 | — | — | — | — |
| Glycerol | — | — | 5 | 5 | 5 | — | — |
| Dimethylformamide | — | — | — | — | — | — | 1 |
| FCF brilliant blue (FD&C blue #1) | — | — | — | — | — | 1 | 0.5 |
| Hydroxypropylcellulose | — | — | — | — | — | — | 0.5 |
| Denatured ethanol | 75 | — | — | 70 | 70 | 74 | 79 |
| Demineralized water | — | 60 | 70 | — | — | — | — |
| Viscosity (mPa.s) | 4.65 | 3.2 | 4.0 | 4.65 | — | 6.0 | 6.8 |
| Conductivity (mS/cm) | >3 | — | 5.46 | 5.3 | — | 3.67 | >3 |

The inks prepared according to the table were tested on ink jet printing devices to make markings on unbaked ceramic (porcelain) plates. Thereafter, these marked plates were heated to temperatures varying from 500° C. to 1250° C. so as to convert the metallic salts into metallic oxides giving the desired colorings.

EXAMPLE 1—e1

With this ink, based on copper nitrate and denatured ethanol, markings, colored black or gray depending on the superimposition of the ink droplets, were obtained after baking at a maximum of 500° C. to allow for the presence of copper oxide which gets volatilized beyond 550° C.

EXAMPLE 2—e2

With this ink, based on chromium III and demineralized water, green markings with good contrast were obtained after baking at 1250° C.

EXAMPLE 3—e3

With this ink, based on cobalt acetate, glycerol and demineralized water, the baking may be done between 500° C. and 1200° C. Blue markings are obtained on objects made of porcelain or on transparent or opaque enamels which cover the porcelain after baking at 1100° C. Black markings are obtained on pure alumina plates or silicate-based enamels after baking at 500° C.

The incorporation of a solvent with low volatility such as glycerol enabled printing operation without crystallization of the cobalt salt in the ink circuit.

EXAMPLE 4—e4

With this ink, based on manganese(II) chloride, glycerol and denatured ethanol, brown markings with excellent contrast were obtained on porcelain plates after baking at 1000° C. It must be noted that this ink is practically invisible before baking.

EXAMPLE 5—e5

With this ink, based on manganese(II) chloride, cobalt chloride II, glycerol and denatured ethanol, gray-blue markings with excellent contrast were obtained after baking at about 1000° C.

EXAMPLE 6—e6

With this ink, based on manganese(II) chloride, brilliant blue FCF (FD&C blue #1) and denatured ethanol, blue markings were obtained before baking because of the organic compound and brown markings were obtained after baking at 1000° C.

EXAMPLE 7—e7

This ink based on cobalt(II) chloride, dimethylformamide, brilliant blue FCF (FD&C blue #1), and hydroxypropylcellulose and denatured ethanol combines all the advantages provided by a solvent with low volatility (dimethylformamide) to give excellent behavior in printing (no crystallization), an organic compound (brilliant blue FCF) to give the legibility of the marking before baking and a polymer (hydroxypropylcellulose) to reduce the spreading of the dyes in the porous material of the object and thus increase the contrast.

Should the solvent be water, it is necessary for it to be demineralized to prevent the influence that the ink might have on the different constituents of the ink before and after baking. Furthermore, it is recommended that an anti-foam agent, such as the one marketed by the firm AIR PRODUCTS under the name SURFYNOL 440, be added to the water.

Generally, the volatile solvent will be an alcohol with low molar mass such as an ethanol or a methanol while the less volatile solvent will be an alcohol with high molar mass such as a glycol, a glycol ether, glycerol or dimethylformamide, as well as their derivatives.

The invention also relates to a method for the marking and decoration of an object that has to be heated to temperatures of over 300° C., said method consisting in:
 spraying an ink jet comprising at least one metallic salt soluble in a solvent as defined here above so as to obtain a printing of the surface of said object according to a determined pattern, and in
 heating the object printed by said ink to a temperature that is sufficient and determined in order to convert said metallic salt or salts into one or more metallic oxides, the color of which corresponds to the one sought.

What is claimed is:

1. An ink that can be sprayed in jets on an object to mark, consisting of a solution of at least one metallic salt dissolved in at least one solvent, wherein said metallic salt is obtained out of a metal which forms, after decomposition by heat, a colored or opaque oxide or a colored combination with the material constituting said object and wherein said solution further comprises at least one dye that is visible before any change in the state of said metallic salt due to an oxidation by rise in temperature and that is compatible with said metallic salt before and during said rise in temperature.

2. An ink according to claim 1, wherein the soluble metallic salt is a mineral or organo-metallic salt of zirconium or of chromium or of tin.

3. An ink according to claim 1, wherein the soluble metallic salt is a mineral or metalorganic salt of manganese, cobalt or iron.

4. An ink according to any of the claims 1 to 3 wherein, in the case of the use of several solvents, one of them may be less volatile than the others.

5. An ink according to claim 4, wherein the solvent with lower volatility is in a proportion of forty percent, at most, of the total mass of ink.

6. An ink according to claim 4, wherein one of the solvents that is less volatile than the others is an alcohol with high molar mass.

7. An ink according to claim 6, wherein the alcohol is selected from the group consisting of glycol, a glycol ether, glycerol or one of their derivatives.

8. An ink according to claim 1, wherein the visible dye is an organic dye.

9. An ink according to claim 8, wherein the organic dye is in a proportion of five percent, at most of the total mass of ink.

10. An ink according to claim 8, wherein the organic dye is an acid dye or a food coloring agent.

11. An ink that can be sprayed in jets on an object to mark, consisting of a solution of at least one metallic salt dissolved in at least one solvent with at least one polymer in a proportion of ten percent, at most, of the total mass of ink, wherein said metallic salt is obtained out of a metal which forms, after decomposition by heat, a colored or opaque oxide or a colored combination with the material constituting said object and wherein said solution further comprises at least one dye that is visible before any change in the state of said metallic salt due to an oxidation by rise in temperature and that is compatible with said metallic salt before and during said rise in temperature.

12. An ink according to claim 1, wherein the soluble metallic salt is an acetate or a propionate of the metal considered.

13. An ink according to claim 1, wherein one of the solvents is an alcohol with low molar mass.

14. An ink according to claim 1, wherein the alcohol is selected from the group consisting of ethanol and methanol.

15. An ink according to claim 11, wherein one of the solvents is demineralized water to which an anti-foam agent is added.

16. A method for the marking and decoration of an object that has to be heated to temperatures of over 300° C., said method consisting in:
spraying an ink jet, designed to obtain a printing of the surface of said object according to a pattern, and in
heating said object printed by said ink to a temperature in excess of 300° C. in order to convert metallic salt or salts in said ink into one or more metallic oxides, the color of which corresponds to the one sought.

* * * * *